UNITED STATES PATENT OFFICE.

RUDOLPH BERENDES AND JÜRGEN CALLSEN, OF ELBERFELD, GERMANY, ASSIGNORS TO FARBENFABRIKEN VORM. FRIEDR. BAYER & CO., OF ELBERFELD, GERMANY, A CORPORATION OF GERMANY.

METHYLENE CITRYL SALICYLIC ACID.

No. 858,142.     Specification of Letters Patent.     Patented June 25, 1907.

Application filed July 27, 1906. Renewed May 4, 1907. Serial No. 371,818.

*To all whom it may concern:*

Be it known that we, RUDOLPH BERENDES and JÜRGEN CALLSEN, doctors of philosophy, chemists, citizens of the German Empire, residing at Elberfeld, Germany, Kingdom of Prussia, Germany, have invented new and useful Improvements in Methylene Citryl Salicylic Acid, of which the following is a specification.

Our invention relates to the preparation of a new pharmaceutical product which is chemically methylene citryl salicylic acid having probably the formula:

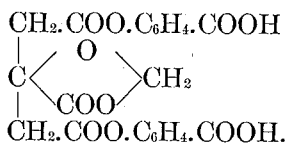

According to our researches this product possesses valuable therapeutic properties and is suitable for use as a medicine for rheumatism, an average dose being about one gram.

The process for producing our new compound consists in treating salicylic acid or its salts with the acid dichlorid of methylene citric acid having probably the formula:

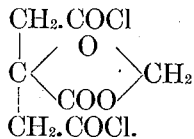

This new product can be produced by treating methylene citric acid with phosphorus pentachlorid.

In order to illustrate our invention we give the following examples, the parts being by weight.

Example 1. 204 parts of methylene citric acid are mixed with 420 parts of phosphorus pentachlorid. A reaction begins, the mixture liquefies with evolution of hydrochloric acid, the temperature rising the while. When the reaction is over either the phosphorus oxychlorid is distilled off and the residue is crystallized from benzene and ligroin or the liquid mass of the reaction is poured on ice. The chlorid separated is filtered off and crystallized from benzene or from a mixture of chloroform and ligroin. It forms colorless and odorless crystals melting at from 74 to 75° centigrade.

A solution of 241 parts of the acid dichlorid of methylene citric acid in benzene is slowly added to a solution of 276 parts of salicylic acid and 484 parts of dimethylanilin in benzene. The reaction begins at once with evolution of heat. The mass of the reaction is allowed to stand for some hours and is shaken with highly diluted hydrochloric acid and then with water. After the benzene is distilled over the residue is crystallized from glacial acetic acid. Instead of dimethylanilin other bases capable of binding acids, such as quinolin, or the like, may be used.

The methylene citryl salicylic acid forms a white crystalline powder melting at from about 157 to 161 centigrade, melting point not being sharply defined. It is odorless and almost tasteless, easily soluble in alcohol and acetone, soluble in chloroform and ether, and scarcely soluble in water. Salicylic acid is split off on heating the new product with caustic alkalies.

Example 2. 428 parts of the finely pulverized dipotassium salt of salicylic acid (obtainable from 2 molecules of KOH and 1 molecule of salicylic acid or from 1 molecule of potassium salicylate and 1 molecule of KOH) are mixed with benzene and to the resulting suspension a solution of 241 parts of the acid dichlorid of methylene citric acid in benzene is slowly added. When the reaction is over highly diluted hydrochloric acid is added. In many cases the new product separates out directly or it may be obtained after the benzene is distilled over. The process is carried out in an analogous manner on using other salts of salicylic acid.

Having now described our invention and in what manner the same is to be performed, what we claim as new, and desire to secure by Letters Patent is:—

The herein described new methylene citryl salicylic acid having probably the above formula, obtainable by the action of the acid dichlorid of methylene citric acid upon salicylic acid, and being a white crystalline powder melting at from about 157 to 161 centigrade, melting point not being sharply defined; being easily soluble in alcohol and acetone, soluble in chloroform and ether and being scarcely soluble in water, salicylic acid being regenerated by heating it with caustic alkalies; and exhibiting valuable therapeutic properties, substantially as hereinbefore described.

In testimony whereof we have hereunto set our hands in the presence of two subscribing witnesses.

RUDOLPH BERENDES. [L. S.]
  JÜRGEN CALLSEN. [L. S.]

Witnesses:
 OTTO KÖNIG,
 T. A. RITTERSHAUS.